US012679726B2

(12) United States Patent
Aasberg-Petersen et al.

(10) Patent No.: US 12,679,726 B2
(45) Date of Patent: Jul. 14, 2026

(54) CONVERSION OF A HYDROCARBON FEED GAS TO SYNTHESIS GAS FOR PRODUCING HYDROCARBONS

(71) Applicant: TOPSOE A/S, Kgs. Lyngby (DK)

(72) Inventors: Kim Aasberg-Petersen, Allerød (DK); Thomas Sandahl Christensen, Kgs. Lyngby (DK)

(73) Assignee: TOPSOE A/S, Kgs. Lyngby (DK)

( * ) Notice: Subject to any disclaimer, the term of this patent is extended or adjusted under 35 U.S.C. 154(b) by 608 days.

(21) Appl. No.: 18/004,548

(22) PCT Filed: Aug. 11, 2021

(86) PCT No.: PCT/EP2021/072408
§ 371 (c)(1),
(2) Date: Jan. 6, 2023

(87) PCT Pub. No.: WO2022/034147
PCT Pub. Date: Feb. 17, 2022

(65) Prior Publication Data
US 2023/0249968 A1      Aug. 10, 2023

(30) Foreign Application Priority Data
Aug. 12, 2020    (DK) ........................... PA 2020 00910

(51) Int. Cl.
*C01B 3/36*        (2026.01)
*B01J 19/24*       (2006.01)
(Continued)

(52) U.S. Cl.
CPC .............. *C01B 3/36* (2013.01); *B01J 19/245* (2013.01); *C10G 2/30* (2013.01); *C25B 1/042* (2021.01);
(Continued)

(58) Field of Classification Search
CPC .... C10G 2/30; C10G 2/32; C01B 3/36; C01B 2203/0233; C01B 2203/0244;
(Continued)

(56) References Cited

U.S. PATENT DOCUMENTS 6,011,073 A      1/2000 Agee et al.
6,696,501 B2     2/2004 Schanke et al.
(Continued)

FOREIGN PATENT DOCUMENTS

CA        2751615 C      6/2014
WO        9919277 A1     4/1999
(Continued)

OTHER PUBLICATIONS

Danish Search Report issued in corresponding Patent Application No. PA 2020 00910 dated Feb. 5, 2021.
(Continued)

*Primary Examiner* — Jafar F Parsa
(74) *Attorney, Agent, or Firm* — Boone IP Law

(57) ABSTRACT

Method and plant for producing a synthesis gas for use in the production of a hydrocarbon product, particularly a synthetic fuel, comprising: providing a hydrocarbon feed gas, providing a first oxygen rich stream by passing air through an air separation unit (ASU), carrying out autothermal reforming of said hydrocarbon feed gas in an autothermal reforming (ATR) unit, said autothermal reforming including using at least a portion of said first oxygen containing stream, providing at least part of said synthesis gas to a synthetic fuel synthesis unit for converting said synthesis gas into said hydrocarbon product and producing a tail gas, recycling part or the entirety of said tail gas to upstream said ATR, providing a first hydrogen rich stream and a second oxygen rich stream, and adding at least a portion of said first
(Continued)

hydrogen rich stream to said synthesis gas prior to entering said synthetic fuel synthesis unit.

10 Claims, 3 Drawing Sheets

(51) Int. Cl.
   *C10G 2/00*       (2006.01)
   *C25B 1/042*      (2021.01)
   *C25B 9/19*       (2021.01)
   *C25B 15/08*      (2006.01)

(52) U.S. Cl.
   CPC .............. *C25B 9/19* (2021.01); *C25B 15/081* (2021.01); *C01B 2203/0233* (2013.01); *C01B 2203/0244* (2013.01); *C01B 2203/062* (2013.01); *C01B 2203/1241* (2013.01); *C01B 2203/142* (2013.01)

(58) Field of Classification Search
   CPC ...... C01B 2203/062; C01B 2203/1241; C01B 2203/142; B01J 19/245; C25B 9/19; C25B 15/081; C25B 1/042
   See application file for complete search history.

(56)                    References Cited

U.S. PATENT DOCUMENTS

| | | | |
|---|---|---|---|
| 2008/0098654 | A1 | 5/2008 | Cherry et al. |
| 2017/0107428 | A1 | 4/2017 | Christensen |
| 2020/0131034 | A1 | 4/2020 | Aasberg-petersen et al. |

FOREIGN PATENT DOCUMENTS

| | | | |
|---|---|---|---|
| WO | 2010122025 | A1 | 10/2010 |
| WO | 2015128395 | A1 | 9/2015 |
| WO | 2016073500 | A1 | 5/2016 |
| WO | 2019020513 | A1 | 1/2019 |
| WO | 2019147786 | A1 | 8/2019 |
| WO | 2019228797 | A1 | 12/2019 |

OTHER PUBLICATIONS

International Search Report (PCT/ISA/210) and Written Opinion (PCT/ISA/237) mailed on Nov. 26, 2021, by the European Patent Office as the International Searching Authority for International Application No. PCT/EP2021/072408.

CONVERSION OF A HYDROCARBON FEED GAS TO SYNTHESIS GAS FOR PRODUCING HYDROCARBONS

FIELD OF THE INVENTION

Embodiments of the invention generally relate to a method and a plant for producing a synthesis gas from a hydrocarbon feed gas such as natural gas, where the synthesis gas is used for the production of a hydrocarbon product, in particular a synthetic fuel such as diesel by subsequent Fischer-Tropsch synthesis, from which a tail gas stream is also produced. In particular, the invention relates to a method and system for producing a synthesis gas for use in the production of a hydrocarbon product by Fischer-Tropsch synthesis, in which the production of the synthesis gas combines optional prereforming of the hydrocarbon feed gas, autothermal reforming, addition of the tail gas from Fischer-Tropsch synthesis to the autothermal reforming step, separate addition of hydrogen produced by preferably electrolysis of a water feedstock, including steam, to the synthesis gas, and optional addition of oxygen produced by the electrolysis to the autothermal reforming, thereby enabling a better utilization of the tail gas being recycled, increasing plant efficiency, increasing carbon efficiency and reducing carbon dioxide emissions.

BACKGROUND OF THE INVENTION

In the production of synthesis gas for the further production of synthetic hydrocarbon products such as diesel, kerosene, jet fuel, naphtha, it is normal to first prepare a synthesis gas by autothermal reforming (ATR) of a hydrocarbon feed gas, preferably by autothermal reforming of a prereformed hydrocarbon feed gas. The hydrocarbon feed gas is typically natural gas. This process scheme for the preparation of synthesis gas is normally referred to as a stand-alone ATR. An Air Separation Unit (ASU) is also needed to supply an oxygen containing steam to the ATR. The thus produced synthesis gas is then passed through a synthetic fuel synthesis unit, from which the above hydrocarbons products are obtained, as well as a tail gas. The synthetic fuel synthesis unit includes typically Fischer-Tropsch (FT) synthesis, from which the tail gas is produced. A plant combining synthesis gas production and subsequent conversion into hydrocarbons including FT synthesis, is herein also referred as a Gas-to-Liquids (GTL) plant or simply as plant.

Normally the FT synthesis requires a synthesis gas with an $H_2/CO$-molar ratio of about 2, for example between 1.8 and 2.1. In the following, this value is also called $(H_2/CO)_{Ref}$. If the feed to the ATR is natural gas, or prereformed natural gas, as well as steam and oxygen, the $H_2/CO$-ratio will typically be higher, such as 2.2-2.4 depending upon a number of factors such as the operating conditions and the natural gas composition. In order to adjust the $H_2/CO$-ratio to the desired value of about 2 as indicated above, it is known to recycle part of the tail gas produced in the FT-synthesis.

The recycle of this CO and $CO_2$-rich tail gas is adjusted to meet the desired $H_2/CO$-ratio in the synthesis gas fed to the FT-synthesis. This recycle of tail gas has the added benefit of recycling methane, and to a lesser extent other hydrocarbons, such as ethane, which has either been formed in the FT-synthesis or not converted into synthesis gas in the unit used for autothermal reforming, i.e. ATR unit.

Part of the tail gas not recycled would normally be used for other purposes such as fuel and/or as a source of energy to drive the ASU or other units consuming power. In some cases, additional tail gas is available for export either by itself or as steam or power.

Numerous efforts have taken place to increase the efficiency of a GTL plant. Examples include the use of heat exchange reforming. Heat exchange reforming may be carried out both in series and parallel with the ATR, such as disclosed in applicant's EP 1,403,216 A1.

Applicant's WO 2015/128395 A1 discloses a process for the production of synthesis gas in which a first hydrocarbon feedstock is passed through a stand-alone ATR, and tail gas produced from downstream FT-synthesis is recycled to upstream the ATR. A second hydrocarbon feedstock, preferably a divided stream from said first hydrocarbon feedstock, is passed through a primary reforming stage, which can be conventional SMR stage (i.e. tubular reforming), heat exchange reforming (HER), or combination of both. The produced synthesis gas streams from the first and second hydrocarbon feedstocks are combined in a specific manner for obtaining a synthesis gas which can be used in downstream FT-synthesis.

Applicant's WO 2019/020513 discloses a process for producing synthesis gas particularly suitable for use in methanol synthesis. The production of synthesis gas includes the use of autothermal reforming. An electrolysis unit produces hydrogen and oxygen, whereby the hydrogen is added to the synthesis gas to adjust the so-called module of the synthesis gas for methanol synthesis ($M=(H_2—CO_2)/(CO+CO_2)$) to preferably slightly above 2, e.g. 2.00-2.10. The oxygen from the electrolysis unit is used in the autothermal reforming. When the synthesis gas is produced from stand-alone ATR, i.e. ATR alone handling the hydrocarbon feed gas or prereformed hydrocarbon feed gas, the module in the synthesis gas is often lower than desired value of preferably slightly above 2.

US 2008/0098654 A1 discloses synthetic fuel production in a coal-to-liquid (CTL) hydrocarbon production process. Coal is converted to synthesis gas (syngas) via gasification/combustion which is then passed through a clean-up process for removing carbon dioxide from the synthesis gas. Tail gas from downstream FT-synthesis is recycled to the gasification stage, i.e. to a gasifier. The oxygen required for gasification can come from an Air Separation Unit (ASU) and/or from electrolysis of water. Hydrogen is also generated from electrolysis of water and can be combined with the synthesis gas prior to being led to FT-synthesis. While not explicitly disclosed, it is well known that coal derived synthesis gas typically has a $H_2/CO$ molar ratio in the range 0.3-1, which is significantly lower than $(H_2/CO)_{Ref}$.

WO 99/19277 A1 discloses a process for converting light hydrocarbons to heavier hydrocarbons with separation of water in the process to produce oxygen and hydrogen. For synthesis gas production, an autothermal reforming unit (ATR) and a gas turbine unit are utilized. The gas turbine unit includes a compressor section and expansion section for powering the separation of water into oxygen and hydrogen. The synthesis gas from the ATR is expanded and then compressed again for thereby being converted to heavier hydrocarbons in a downstream Fischer-Tropsch reactor under the production of a residual gas which after a separation in e.g. a membrane or carbon absorption centrifugal device, may be supplied to the ATR. For counteracting imbalance in mass flow created by the supply of the residual gas to the ATR, a first separator such as a membrane or carbon absorption is provided, thereby removing nitrogen or compressed air. Hence, there is high complexity in the process and plant, as a gas turbine is required for generating the power needed for the separation of water into oxygen and hydrogen, synthesis gas needs to be expanded and then compressed prior to entering the Fischer-Tropsch reactor, as well as requiring the provision of said first separator e.g. a membrane to address the imbalance in mass flow created by addition of residual gas to the ATR.

SUMMARY OF THE INVENTION

It is an object of the present invention to achieve a better utilization of tail gas produced in the FT-synthesis of a GTL plant.

It is another object of the present invention to increase the GTL plant efficiency while also reducing $CO_2$-emissions.

It is yet another object of the present invention to provide a simpler process and plant for converting light hydrocarbons to heavier hydrocarbons, while achieving a better utilization of the tail gas generated in the process.

It is yet another object of the present invention to provide a process and plant with increased carbon efficiency and reduced $CO_2$-carbon emissions (reduced carbon footprint).

These and other objects are solved by the present invention.

Hence, in a first aspect, the invention provides a method for producing a synthesis gas for use in the production of a hydrocarbon product, particularly a synthetic fuel, comprising the steps of:

providng a hydrocarbon feed gas, providing a first oxygen rich stream by passing air through an air separation unit (ASU), carrying out autothermal reforming of said hydrocarbon feed gas in an autothermal reforming (ATR) unit, said autothermal reforming including using at least a portion of said first oxygen containing stream, providing at least part of said synthesis gas to a synthetic fuel synthesis unit for converting said synthesis gas into said hydrocarbon product and producing a tail gas, recycling a part or the entirety of said tail gas to upstream said ATR, providing a first hydrogen rich stream and a second oxygen rich stream, and adding at least a portion of said first hydrogen rich stream to said synthesis gas prior to entering said synthetic fuel synthesis unit.

For the purposes of the present application, the term "method" and "process" are used interchangeably.

By the term "synthetic fuel synthesis unit" is meant a unit comprising a Fischer-Tropsch (FT) synthesis section comprising one or more FT-synthesis units, i.e. FT-reactor(s). The synthetic fuel synthesis unit may also include other units such as a Product Workup Unit (PWU) comprising one or more refining units such as hydrorefining unit(s), e.g. a hydrocracking unit, for upgrading the raw hydrocarbon product into the hydrocarbon product(s). The PWU may be located at the same site as the FT-synthesis unit(s) and other associated units or in a separate location.

The hydrocarbon product is preferably a synthetic fuel, such as diesel and/or kerosene. The hydrocarbon product can also be in the form of naphtha and/or LPG (Liquid Petroleum Gas). For details on FT synthesis section, reference is given to Steynberg A. and Dry M. "Fischer-Tropsch Technology", Studies in Surface Sciences and Catalysts, vol. 152.

By "tail gas" or "FT tail gas" is meant off-gas from a Fischer-Tropsch synthesis unit, the tail gas may comprise: 5-35% vol. CO, 5-35% vol. $H_2$, 5-35% vol. $CO_2$, more than 2% vol. $CH_4$. The tail gas may also comprise higher hydrocarbons such as ethane and propane and including olefins, as well as argon and nitrogen.

By the term "a part of said tail gas" is meant that a portion of it is recycled upstream the ATR, or a portion of the tail gas may be recycled to a prereforming unit and another portion to the ATR.

It would also be understood that the term "upstream", e.g. "upstream said ATR" includes also adding the stream directly to the ATR.

Autothermal reforming (ATR), as mentioned previously, is a technology commonly used for the production of synthesis gas (syngas), where the conversion of a hydrocarbon feedstock, such as natural gas, is carried out in a single reactor through the combination of partial combustion and steam reforming. The ATR reactor consists of a burner, a combustion chamber and a fixed bed catalyst section contained in a refractory lined pressure shell. The key elements in the ATR reactor are the burner and the catalyst bed. ATR technology is well-known in the art, for which reference is given to i.a. above mentioned applicant's patent WO 2015/128395 A1. For additional details about ATR technology, reference is given to e.g. "Studies in Surface Science and Catalysis, Vol. 152, "Synthesis gas production for FT synthesis"; Chapter 4, p. 258-352, 2004".

The recycle of FT tail gas and the addition of hydrogen, for instance hydrogen produced from electrolysis, to the synthesis gas is known from instances where the synthesis gas produced stems from coal gasification, such as in e.g. the coal derived synthesis gas of the above-mentioned US 2008/0098654 A1. The reason is that coal derived synthesis gas typically has a $H_2/CO$ molar ratio in the range 0.3-1, which is significantly lower than the desired value of about 2. However, as already mentioned above, the $H_2/CO$-ratio from an ATR is much higher than the desired value of about 2, for instance 2.2-2.4. While the recycling of tail gas to the autothermal reforming may mitigate this problem, given that the tail gas contains significant amounts of $CO_2$ and CO, the addition of hydrogen to the synthesis gas would actually mean increasing its $H_2/CO$-ratio above the desired value of about 2. Thus, a hydrogen separation unit will be needed to remove excess hydrogen from the synthesis gas.

Yet, the present invention adds hydrogen to the synthesis gas and surprisingly enables now not only obtaining a synthesis gas for downstream FT-synthesis having the desired $H_2/CO$-ratio of about 2, but also a better utilization of the tail gas. In other words, the recycle of tail gas from downstream FT-synthesis and addition of hydrogen to the synthesis gas, combine synergistically for obtaining a method and plant with better tail gas utilization. More tail gas is thereby available for recycle to the ATR, which is a more efficient utilization of the tail gas rather than using it as fuel and other purposes. Increased carbon efficiency in the process and plant is thereby obtained. In addition, the oxygen produced by electrolysis reduces the amount of energy needed for driving the ASU, further aiding in increasing the energy efficiency of the plant. The hydrogen also being produced by the electrolysis, is also efficiently integrated in the process and/or plant. Moreover, the plant carbon dioxide emission per unit of hydrocarbon product is also reduced.

More specifically, a higher amount of tail gas may be recycled to the autothermal reforming, which is highly desirable during operation of the plant. Normally the portion of the tail gas which is not recycled is used as fuel for e.g. process heaters, yet there is often an excess of tail gas which cannot be recycled or reused for other purposes. Further, burning of the excess tail gas in e.g. process heaters generates carbon dioxide thereby increasing the carbon footprint of the plant. Accordingly, additional tail gas can now be recycled to the ATR resulting in an $H_2/CO$-ratio in the gas leaving the ATR reactor lower than $(H_2/CO)_{Ref}$. The $H_2/CO$-ratio is increased to the desired value of $(H_2/CO)_{Ref}$ by addition of additional hydrogen to the synthesis gas, thereby increasing the efficiency (carbon efficiency) of the GTL plant and reducing its carbon footprint.

In an embodiment according to the first aspect of the invention, the method is absent of a carbon dioxide removal stage (i.e. in a carbon dioxide removal section such as an amine absorption unit) for removing of carbon dioxide from the synthesis gas.

In another embodiment according to the first aspect of the invention, the method is absent of a hydrogen removal stage (i.e. in a hydrogen purification unit such as pressure swing adsorption unit) for removing of hydrogen from the synthesis gas In another embodiment according to the first aspect of the invention, the method is absent of a separation stage (e.g. in a membrane or similar) in between the air separation unit and the ATR.

By the present invention, the synthesis gas from the ATR avoids the need to be expanded and then compressed prior to entering said synthetic fuel synthesis unit.

In an embodiment according to the first aspect of the invention, the method further comprises adding at least a portion of said second oxygen rich stream to said autothermal reforming step, preferably by combining with said first oxygen rich stream. This enables the reduction of the amount of oxygen that needs to be produced by the ASU, this unit typically being a large and costly cryogenic air separation unit. Since oxygen is also provided from a separate source, the size and costs associated with the ASU are significantly reduced. This also means that less energy is needed for driving the ASU and adds to the advantage of more tail gas being available for recycle to the ATR. Overall the efficiency of the plant will be higher and the $CO_2$-emissions lower.

In an embodiment according to the first aspect of the invention, the step of providing said first hydrogen rich stream and said oxygen rich stream is conducted by electrolysis of a water feedstock. The term water feedstock includes water and/or steam. Hence, the use of a separate hydrocarbon feedstock from fossil fuels, such as natural gas, for preparation of a separate hydrogen rich stream, may be totally omitted. Preferably, the electrolysis is conducted by solid oxide based electrolysis (SOEC), electrolysis by alkaline cells e.g. alkaline fuel cells (AFC), polymer cells (PEM), or any combinations thereof. The electrolysis unit may be one or more units in combination. Such electrolysis technologies are well known in the art.

In an embodiment according to the first aspect of the invention, the electrolysis is conducted in a solid oxide electrolysis cell unit and said water feedstock is in the form of steam produced from other processes of the method. Hence, steam produced in e.g. downstream FT-synthesis, is advantageously used and integrated into the method (process) or plant, i.e. GTL plant. In another embodiment the steam produced by cooling of the ATR exit gas is used as water feedstock.

In an embodiment according to the first aspect of the invention, an intermediate step of compressing the oxygen and/or the hydrogen may be required between the electrolysis step and the subsequent method steps.

In an embodiment according to the first aspect of the invention, the power required in the step of providing a first oxygen rich stream by passing air through an air separation unit (ASU), or the step of electrolysis of a water feedstock, is provided at least partly by renewable sources, such as wind and solar energy. This enables an even more sustainable method (process) and plant.

In an embodiment according to the first aspect of the invention, the method further comprises:
pre-reforming of the hydrocarbon feed gas together with a steam feedstock in a pre-reforming unit prior to said autothermal reforming,
and/or
purifying the hydrocarbon feed gas in a gas purification unit prior to said autothermal reforming, and/or prior to said pre-reforming.

In the pre-reforming unit(s) all higher hydrocarbons can be converted to carbon oxides and methane, but the pre-reforming unit(s) are also advantageous for light hydrocarbons. Providing the pre-reforming unit(s), hence a pre-reforming step, may have several advantages including the provision of an efficient sulphur guard resulting in a practically sulphur free feed gas entering the downstream units. The pre-reforming step may be carried out at temperatures between 300-650° C., preferably 390-500° C., such as 390-480° C. Preferably, pre-reforming is conducted in one or more adiabatic pre-reforming stages with inter-stage preheating, i.e. with heating in between pre-reforming stages.

Also, an optional step of purifying the hydrocarbon feed gas in a gas purification unit may be provided prior to said steam reforming, and/or prior to said pre-reforming. In the gas purification unit, the hydrocarbon feed gas, preferably natural gas, impurities such as sulfur, chlorine and heavy metals are removed by use of several catalytic reactors, as is well known for the skilled person. Prior to entering the gas purification unit, a small amount of hydrogen may be added to the natural gas; the natural gas may also be compressed and preheated to the required temperature of the purification unit.

In an embodiment according to the first aspect of the invention, the method further comprises providing a second hydrogen rich stream by steam methane reforming of a hydrocarbon feed gas, preferably by steam methane reforming of a separate stream of hydrocarbon feed gas. While said steam methane reforming would normally be conducted by SMR (tubular reforming), it is preferably conducted by eSMR (electrically heated reforming reactor). The eSMR is suitably powered, as the electrolysis unit, by renewable sources such as wind or solar, thereby reducing the carbon footprint which will be associated with the use of conventional tubular reforming, or similar e.g. convection reforming. For the former reforming technology (tubular reforming), reference is also given to "Studies in Surface Science and Catalysis, Vol. 152, "Synthesis gas production for FT synthesis"; Chapter 4, p. 258-352, 2004". For the latter, electrically heated reforming reactor, reference is given to applicant's patent application WO 2019/228797 A1.

In an embodiment according to the first aspect of the invention, the method further comprises adding part of said second hydrogen rich stream to said synthetic fuel synthesis unit, preferably to the PWU thereof, and/or to said gas purification unit.

In an embodiment according to the first aspect of the invention, the method further comprises combining said first hydrogen rich stream with said second hydrogen rich stream for forming a hydrogen product stream. Thus, the produced hydrogen is combined and may be distributed to hydrogen consumers. Optionally, a portion of the hydrogen product stream is added to said synthetic fuel synthesis unit, preferably to the PWU thereof, and/or to said gas purification unit. Preferably also, the method further comprises hydrogen purification in a hydrogen purification unit such as a Pressure Swing Adsorption (PSA) unit of said second hydrogen rich stream, prior to combining with said first hydrogen rich stream. Prior to passing through the hydrogen purification unit, treatment in a water gas shift unit for enriching in hydrogen may also be conducted.

In an embodiment according to the first aspect of the invention, the hydrocarbon feed gas is natural gas, methane, LNG, naphtha or mixtures thereof.

Two specific modes of operation for increasing the capacity, debottlenecking, increasing the efficiency, and/or decreasing the $CO_2$-emissions of an existing GTL plant are provided below. The existing GTL plant is a conventional plant, i.e. without hydrogen or oxygen addition by electrolysis, and is designed to operate or operates at reference operating conditions. The overall steam-to-carbon (overall S/C-ratio) of the existing GTL plant at reference operating conditions is $(S/C)_{Ref}$, for instance 0.6 or lower. As used herein, the overall S/C-ratio is defined as the molar ratio of steam added for producing the synthesis gas, divided by the carbon in the hydrocarbon feed gas e.g. natural gas. Natural gas consumed as fuel is not included. Accordingly:

In one embodiment according to the first aspect of the invention, the method further comprises:

increasing or decreasing the volumetric tail gas recycle flow from the synthetic fuel synthesis unit to the to the ATR compared to reference operating conditions of the GTL plant, for producing a synthesis gas having a $H_2/CO < (H_2/CO)_{Ref}$;

providing said first hydrogen rich stream, e.g. by electrolysis of a water feedstock, and adding it to said synthesis gas, for producing a final synthesis gas with an $H_2/CO$-ratio equal to $(H_2/CO)_{Ref}$, e.g. 2.0;

adding said second oxygen rich stream, e.g. by electrolysis of a water feedstock, to the ATR.

The plant capacity is thereby increased.

These operation modes may be conducted in several smaller steps. It is envisaged, that the tail gas flow is increased or even slightly decreased. In the latter case the reduction of the tail gas flow is limited such that hydrogen is still needed for reaching an $H_2/CO$-ratio equal to $(H_2/CO)_{Ref}$.

In another embodiment according to the first aspect of the invention, the method further comprises:

reducing the overall S/C-ratio to a new overall S/C-ratio being less than $(S/C)_{Ref}$, e.g.

by reducing the amount of steam used in the ATR for thereby achieving an overall S/C-ratio of for instance 0.5 down from a $(S/C)_{Ref}$ of for instance 0.6;

maintaining the volumetric tail gas recycle flow unchanged;

providing said first hydrogen rich stream, e.g. by electrolysis of a water feedstock, and adding it to said synthesis gas, for producing a final synthesis gas with an $H_2/CO$-ratio equal to $(H_2/CO)_{Ref}$, e.g. 2.0 adding said second oxygen rich stream, e.g. by electrolysis of a water feedstock, to the ATR.

Optionally, the various flows are adjusted to provide a new plant capacity higher than the original capacity of the plant.

In a second aspect, the invention comprises also a plant (process plant) for producing a synthesis gas for use in the production of a hydrocarbon product, particularly a synthetic fuel, comprising:

an air separation unit (ASU) arranged to receive air for producing a first oxygen rich stream, an electrolysis unit arranged to receive a water feedstock (incl. steam) for producing a first hydrogen rich stream and a second oxygen rich stream, an autothermal reforming (ATR) unit for steam reforming of a hydrocarbon feed gas, a synthetic fuel synthesis unit arranged to receive at least part of the synthesis gas from said autothermal reforming unit for converting said synthesis gas into said hydrocarbon product and for producing a tail gas, a conduit for recycling a portion or the entirety of said tail gas to upstream said ATR unit, a conduit for adding said first hydrogen rich stream to said synthesis gas, upstream said synthetic fuel synthesis unit, a conduit for adding said second oxygen rich stream to said ATR unit and/or for combining with said first oxygen rich stream, optionally, a prereforming unit upstream said autothermal reforming unit, and/or a gas purification unit for purification of the hydrocarbon gas upstream said prereforming unit and/or upstream said autothermal reforming unit.

In an embodiment according to the second aspect of the invention, the system further comprises an eSMR (electrically heated reforming reactor) for steam methane reforming of a hydrocarbon feed gas, the hydrocarbon feed gas preferably being a separate stream of hydrocarbon feed gas, thereby producing a second hydrogen rich stream.

In an embodiment according to the second aspect of the invention the synthetic fuel synthesis unit is a Fischer-Tropsch (FT) synthesis unit, preferably a low temperature FT unit. Again, reference is given to Steynberg A. and Dry M. "Fischer-Tropsch Technology", Studies in Surface Sciences and Catalysts, vol. 152.

Any of the embodiments and associated benefits according to the first aspect can be used together with any of the embodiments according to second aspect of the invention, and vice-versa.

DETAILED DESCRIPTION

Figure 1:
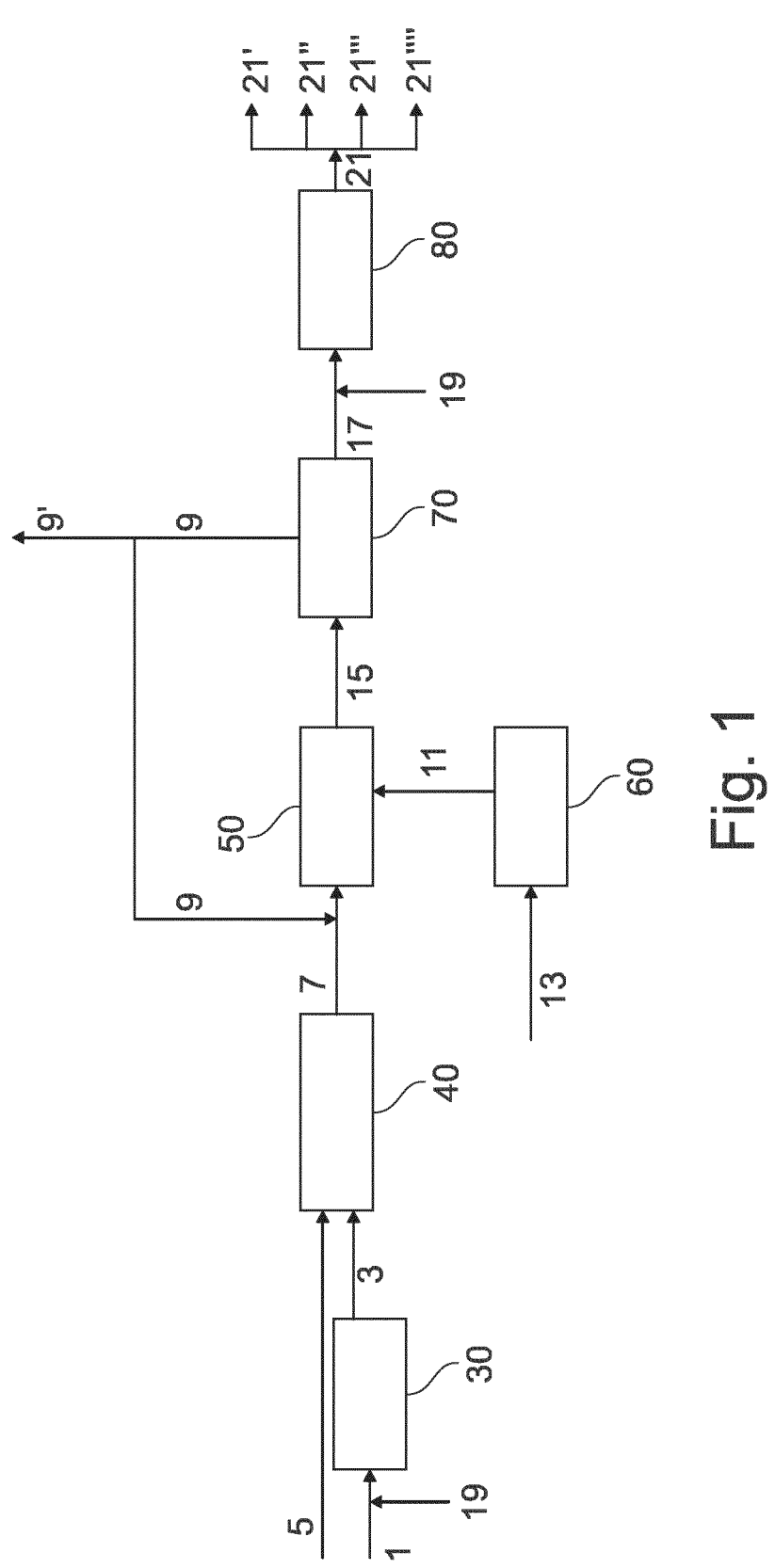
FIG. 1 illustrates a conventional process and plant layout for production of a hydrocarbon product according to the prior art.

In FIG. 1 a hydrocarbon feed gas such as natural gas 1 is combined with hydrogen 19 and then purified in purification unit 30, for instance by removing sulfur in the natural gas which may be detrimental for catalysts used in downstream units. Water or steam together with the purified hydrocarbon feed 3 enters a prereforming unit 40 thereby forming a hydrocarbon feed gas in the form of purified and preformed gas 7, which is combined from recycled tail gas 9 from downstream Fischer Tropsch (FT)-unit 70. Part of the tail gas 9 is used as fuel and other purposes, as stream 9'. The resulting mixture of prereformed gas and recycled tail gas enters the autothermal reforming unit (ATR) 50, as so is an oxygen rich stream 11 provided from an Air Separation Unit (ASU) 60 using air stream 13. From the ATR a synthesis gas

15 is produced which due to the tail gas recycle, has the right molar ratio of $H_2$ to CO, i.e. of about 2. The synthesis gas 15 is then processed in downstream synthetic fuel synthesis unit comprising a FT-unit/reactor 70 and Product Workup Unit 80. From the FT-unit a raw hydrocarbon stream 17 is withdrawn and hydrogen 19 from an external source is add-mixed for conducting one or more hydrotreating steps in the PWU 80. A hydrocarbon product 21 is withdrawn comprising a range of products including synthetic fuels such as diesel $21^{IV}$. The range of hydrocarbon products illustrated here are LPG (Liquified Petroleum Gas) 21', naphtha 21", jet fuel 21''' and diesel $21^{IV}$.

Figure 2:
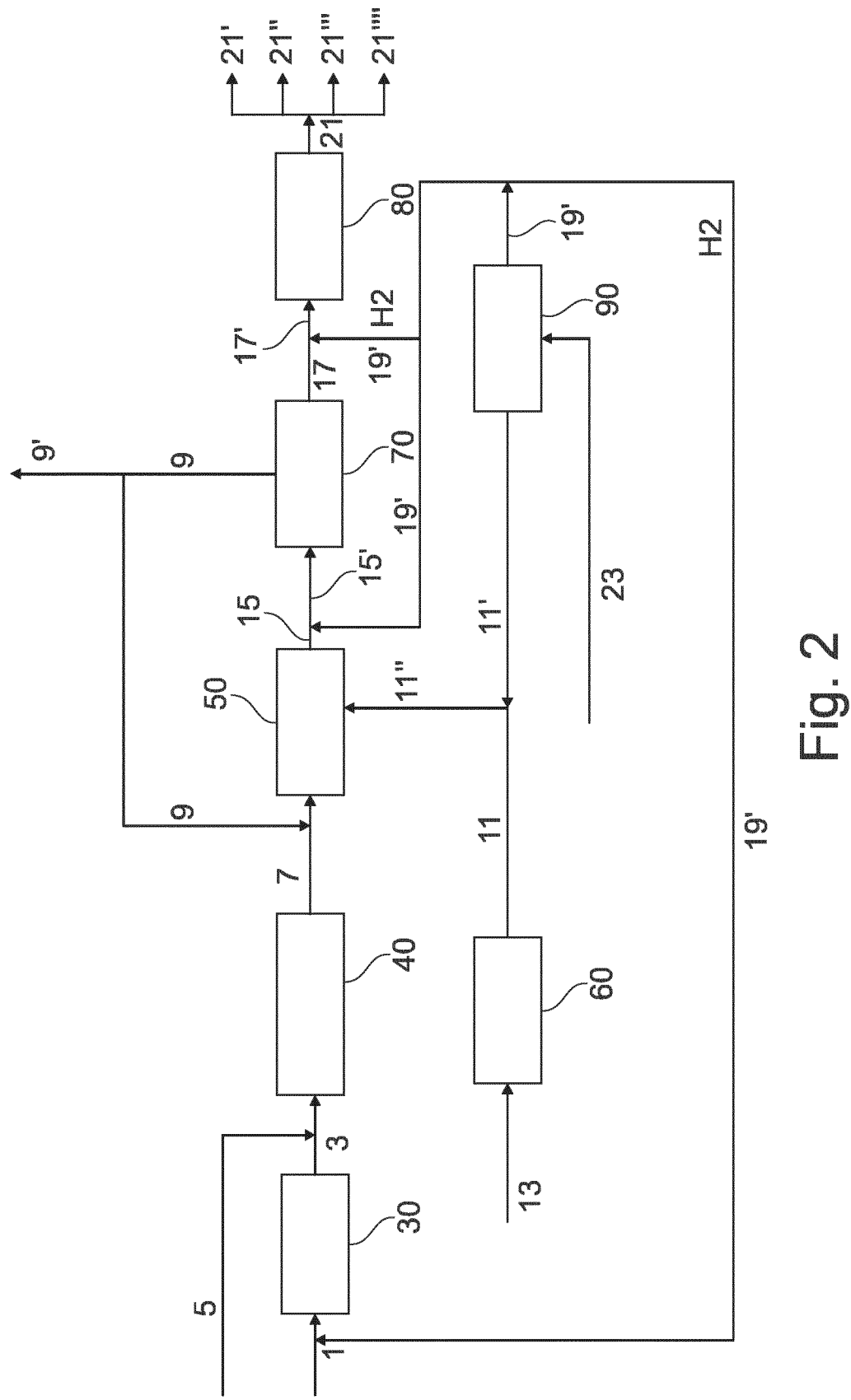
FIG. 2 illustrates a process and plant layout for production of a hydrocarbon product according to one embodiment of the invention.

With reference to FIG. 2 showing an embodiment according to the invention, electrolysis unit 90 is now included. This unit can be either PEM, AFC and/or SOEC. A water feedstock such as steam 23 is used for the electrolysis and the unit is powered by renewable sources, such as power from wind or solar energy. The electrolysis produces a second oxygen rich stream 11' which is combined with first oxygen rich stream 11 produced in the ASU 60, thereby forming a combined oxygen rich stream 11" which is used in the ATR 50. The size of the ASU 60 and can thereby be significantly reduced. From the electrolysis unit 90, a first hydrogen rich stream 19' is produced, which may be recycled to the natural gas feed 1, and/or be added to the synthesis gas 15 or to the raw hydrocarbon stream 17 from the FT-unit 70. The provision of the first hydrogen stream 19' from electrolysis 90 in combination with tail gas 9 recycle is highly counterintuitive. The tail gas recycle stream 9 enables on its own, as shown in FIG. 1, that the $H_2/CO$ molar ratio in the synthesis gas be brought to the desired value of about 2. Hence, the expected result of adding a first hydrogen rich stream 19' to the synthesis gas 15 would have been a synthesis gas stream 15' having a significantly higher value of $H_2/CO$ i.e. much higher than 2. The invention enables that more tail gas 9 is available for recycle to the ATR 50, which is a more efficient utilization of the tail gas rather than using it as fuel and other purposes (stream 9'). Thus, the invention enables significantly reducing the amount of this tail gas stream 9'. Increased carbon efficiency in the process and plant is thereby obtained, as well as the carbon foot-print. Furthermore, the second oxygen rich stream 11' produced in the electrolysis 90 reduces the amount of energy needed for driving the ASU 60, further aiding in increasing the efficiency of the plant. First hydrogen rich stream 19' being produced from the electrolysis, is also efficiently integrated in the process.

Figure 3:
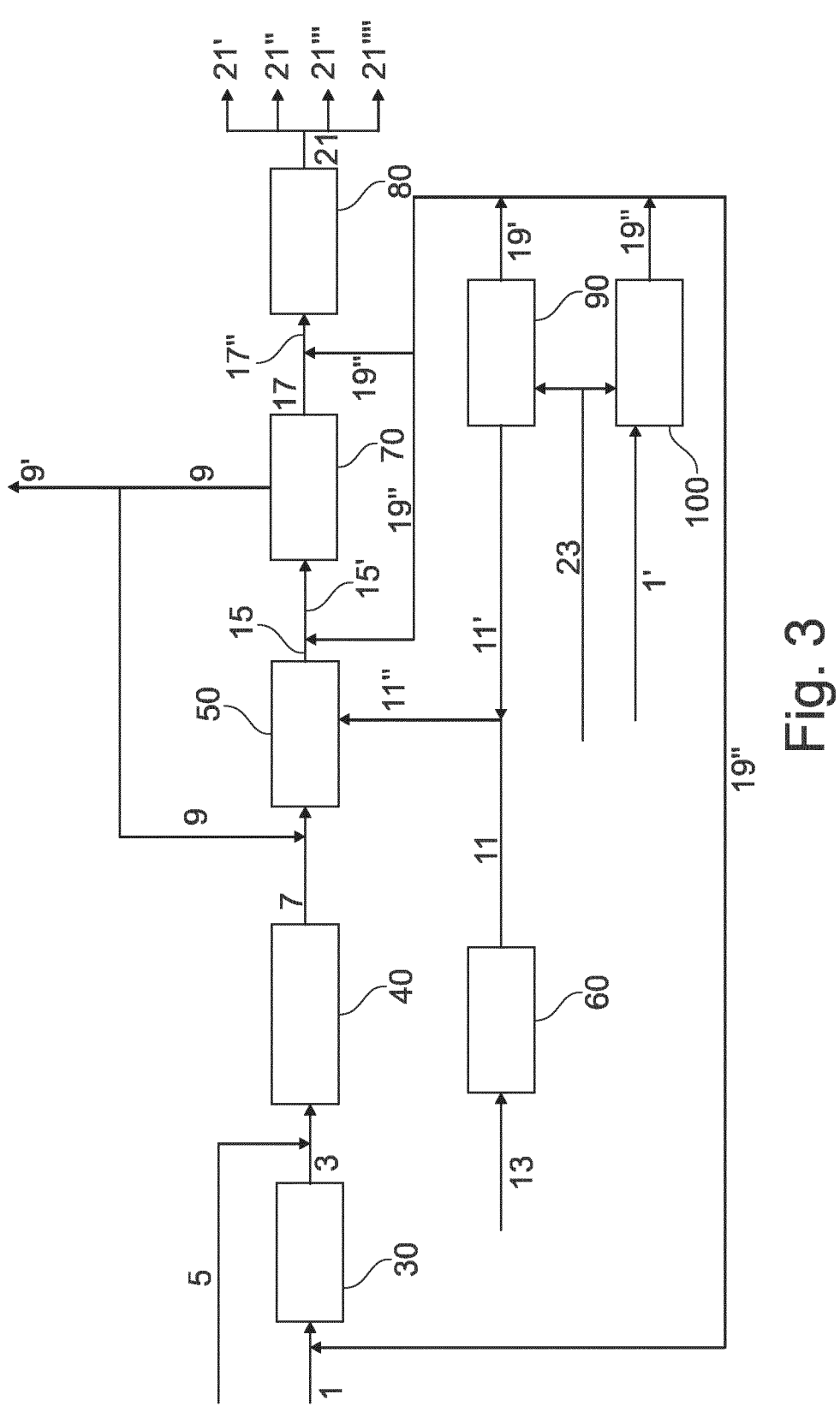
FIG. 3 illustrates a process and plant layout for production of a hydrocarbon product according to another embodiment of the invention.

With respect to FIG. 3, another embodiment according to the invention is illustrated, in which in addition to the units of FIG. 2, a separate unit for steam reforming 100, such as SMR or eSMR is used in the process/plant. The eSMR, whereby heat is produced by resistance heating using a power source, may also be driven, as in the electrolysis unit 90, by power provided by renewable sources, such as wind and solar energy. A separate hydrocarbon feed gas such as natural gas 1', for instance a diverted stream from natural gas stream 1, is used in the steam reforming, thereby producing a second hydrogen rich stream 19" which may be recycled to the natural gas stream 1, or combined with the first hydrogen stream 19' from the electrolysis unit 90. The hydrogen stream 19" may undergo a purification step in a pressure swing adsorption (not shown) and/or prior to this, be subjected to water gas shift (not shown) for enriching the synthesis gas from the steam reforming unit 100 in hydrogen.

The invention claimed is:

1. A method for producing a synthesis gas for use in the production of a hydrocarbon product, comprising the steps of:

providing a hydrocarbon feed gas, providing a first oxygen rich stream by passing air through an air separation unit (ASU), carrying out autothermal reforming of said hydrocarbon feed gas in an autothermal reforming (ATR) unit, said autothermal reforming including using at least a portion of said first oxygen rich stream to produce said synthesis gas, providing at least part of said synthesis gas to a synthetic fuel synthesis unit for converting said synthesis gas into said hydrocarbon product and producing a tail gas, recycling a part or an entirety of said tail gas to upstream of said ATR, providing a first hydrogen rich stream and a second oxygen rich stream, wherein the step of providing said first hydrogen rich stream and said second oxygen rich stream is conducted by electrolysis of a water feedstock, adding at least a portion of said first hydrogen rich stream to said synthesis gas prior to entering said synthetic fuel synthesis unit, adding at least a portion of said second oxygen rich stream to said autothermal reforming step, and providing a second hydrogen rich stream by steam methane reforming of a hydrocarbon feed gas, wherein said steam methane reforming is conducted by eSMR (electrically heated reforming reactor).

2. The method according to claim 1, wherein the electrolysis is conducted in a solid oxide electrolysis cell unit and said water feedstock is in the form of steam produced from other processes of the method.

3. The method according to claim 1, wherein power required in the step of providing a first oxygen rich stream by passing air through an air separation unit (ASU), or the step of electrolysis of a water feedstock, is provided at least partly by renewable sources.

4. The method according to claim 1, further comprising at least one of the following:

pre-reforming of the hydrocarbon feed gas together with a steam feedstock in a pre-reforming unit prior to said autothermal reforming, and purifying the hydrocarbon feed gas in a gas purification unit prior to said autothermal reforming, and/or prior to said pre-reforming.

5. The method according to claim 1, the method further comprising adding part of said second hydrogen rich stream to said synthetic fuel synthesis unit.

6. The method according to claim 1, further comprising combining said first hydrogen rich stream with said second hydrogen rich stream for forming a hydrogen product stream, and optionally adding a portion of the hydrogen product stream to said synthetic fuel synthesis unit.

7. The method according to claim 6, further comprising hydrogen purification in a hydrogen purification unit, prior to combining with said first hydrogen rich stream.

8. The method according to claim 1, further comprising:

increasing or decreasing the volumetric tail gas recycle flow from the synthetic fuel synthesis unit to the to the ATR compared to reference operating conditions of the GTL plant, for producing a synthesis gas having a $H_2/CO < (H_2/CO)_{Ref}$;

providing said first hydrogen rich stream and adding it to said synthesis gas, for producing a final synthesis gas with an $H_2/CO$-ratio equal to $(H_2/CO)_{Ref}$;

adding said second oxygen rich stream to the ATR.

9. The method according to claim 1, further comprising:

reducing the overall S/C-ratio to a new overall S/C-ratio being less than $(S/C)_{Ref}$;

maintaining the volumetric tail gas recycle flow unchanged;

providing said first hydrogen rich stream and adding it to said synthesis gas, for producing a final synthesis gas with an $H_2/CO$-ratio equal to $(H_2/CO)Ref$;

adding said second oxygen rich stream to the ATR.

10. A plant for producing a synthesis gas for use in the production of a hydrocarbon product, comprising:

an air separation unit (ASU) arranged to receive air for producing a first oxygen rich stream, an electrolysis unit arranged to receive a water feedstock for producing a first hydrogen rich stream and a second oxygen rich stream, an authothermal reforming (ATR) unit for steam reforming of a hydrocarbon feed gas, a synthetic fuel synthesis unit arranged to receive at least part of the synthesis gas from said autothermal reforming unit for converting said synthesis gas into said hydrocarbon product and for producing a tail gas, a conduit for recycling a portion or the entirety of said tail gas to upstream said ATR unit, a conduit for adding said first hydrogen rich stream to said synthesis gas, upstream said synthetic fuel synthesis unit, a conduit for adding said second oxygen rich stream to said ATR unit and/or for combining with said first oxygen rich stream, an eSMR (electrically heated reforming reactor) for steam methane reforming of a hydrocarbon feed gas, thereby producing a second hydrogen rich stream, and optionally, a prereforming unit upstream said autothermal reforming unit, and/or a gas purification unit for purification of the hydrocarbon gas upstream said prereforming unit and/or upstream said autothermal reforming unit.

* * * * *